US010015673B2

(12) United States Patent
Silis

(10) Patent No.: US 10,015,673 B2
(45) Date of Patent: Jul. 3, 2018

(54) CELLULAR DEVICE AUTHENTICATION

(71) Applicant: T-Mobile USA, Inc., Bellevue, WA (US)

(72) Inventor: Arturo Silis, Newcastle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/629,667

(22) Filed: Jun. 21, 2017

(65) Prior Publication Data

US 2017/0289803 A1 Oct. 5, 2017

Related U.S. Application Data

(63) Continuation of application No. 15/051,447, filed on Feb. 23, 2016, now Pat. No. 9,699,655.

(51) Int. Cl.
H04W 12/06 (2009.01)
H04L 29/06 (2006.01)
H04W 12/04 (2009.01)

(52) U.S. Cl.
CPC ......... H04W 12/06 (2013.01); H04L 63/0442 (2013.01); H04L 63/061 (2013.01); H04W 12/04 (2013.01)

(58) Field of Classification Search
CPC .. H04W 12/06; H04W 12/04; H04L 63/0442; H04L 9/3247; H04L 63/0435; H04L 63/0471; H04L 63/083; H04L 9/14
See application file for complete search history.

(56) References Cited

U.S. PATENT DOCUMENTS

| | | | | |
|---|---|---|---|---|
| 8,321,677 B2* | 11/2012 | Morten | ............... | H04L 63/126 380/44 |
| 9,479,340 B1* | 10/2016 | Miller | ............... | H04L 9/3268 |
| 9,699,655 B1* | 7/2017 | Silis | ............... | H04W 12/06 |
| 9,716,698 B2* | 7/2017 | Abdallah | ............... | H04L 63/06 |
| 2003/0028763 A1 | 2/2003 | Malinen | | |
| 2004/0034772 A1 | 2/2004 | Alao | | |
| 2004/0117623 A1* | 6/2004 | Kalogridis | ............... | H04L 63/0807 713/165 |
| 2012/0260090 A1 | 10/2012 | Hauck et al. | | |
| 2015/0038118 A1* | 2/2015 | Berteau | ............... | H04L 9/3271 455/411 |

(Continued)

OTHER PUBLICATIONS

Office Action for U.S. Appl. No. 15/051,447, dated Nov. 4, 2016, Arturo Sills, "Cellular Device Authentication", 11 pages.

(Continued)

Primary Examiner — Diane Mizrahi
(74) Attorney, Agent, or Firm — Lee & Hayes, PLLC

(57) ABSTRACT

When manufacturing, distributing, or selling mobile phones, each phone is associated with an asymmetric cryptographic key pair, comprising a public key and a private key. The private key is stored on the phone, and the public key is stored in a public key repository. When connecting to a cellular network, a phone provides its device ID to the network. The cellular network queries the public key repository to determine the public key of the phone and authenticates the phone using the phone's public key. The cellular network also provides a digital identity certificate to the phone, allowing the phone to authenticate the cellular network using a public key infrastructure (PKI).

20 Claims, 5 Drawing Sheets

(56) References Cited

U.S. PATENT DOCUMENTS

| | | |
|---|---|---|
| 2015/0143125 A1 | 5/2015 | Nix |
| 2015/0312698 A1 | 10/2015 | Schell et al. |
| 2015/0326568 A1 | 11/2015 | Hauck et al. |
| 2016/0020804 A1 | 1/2016 | Lee et al. |
| 2016/0218874 A1 | 7/2016 | Hauck et al. |
| 2016/0337325 A1* | 11/2016 | Blomqvist ............ H04L 9/3247 |

OTHER PUBLICATIONS

PCT Search Report and Written Opinion dated May 10, 2017 for PCT Application No. PCT/US17/16929, 15 pages.

\* cited by examiner

CELLULAR DEVICE AUTHENTICATION

CROSS REFERENCE TO RELATED APPLICATIONS

This application is a continuation of and claims priority to commonly-assigned, co-pending U.S. patent application Ser. No. 15/051,447, filed Feb. 23, 2016. Application Ser. No. 15/051,447 is fully incorporated herein by reference.

BACKGROUND

Cellular communication devices such as cellular telephones typically use integrated circuit chips, referred to as subscriber identification modules (SIMs), to authenticate with cellular network providers. A SIM stores what is known as an international mobile subscriber identity (IMSI) number, as well as various configuration information that is specific to the issuing network provider. A SIM also stores unique, secret cryptography keys, and has a processor that performs encryption and decryption based on the secret keys.

The network provider maintains a database, referred to as an authentication center (AuC), that stores the secret keys of each issued SIM. In order to authenticate with a cellular communication system, a device sends the SIM's IMSI to the network provider. The network provider refers to the AuC to find the secret keys of the SIM. The network provider then sends a random value (RAND) to the device. The device passes the random number to the SIM, and the SIM generates a digital signature of the RAND using the secret keys. The digital signature is passed back to the network provider and compared to the digital signature of the RAND that has been computed by the network provider using the secret keys. If the digital signature provided by the device matches the digital signature computed by the network provider, the device is considered to be authenticated and is given access to the cellular network. The SIM performs a similar digital signature check to validate the network provider request. Further communications are encrypted and decrypted using a session keys that are established between the device and the network provider AuC.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
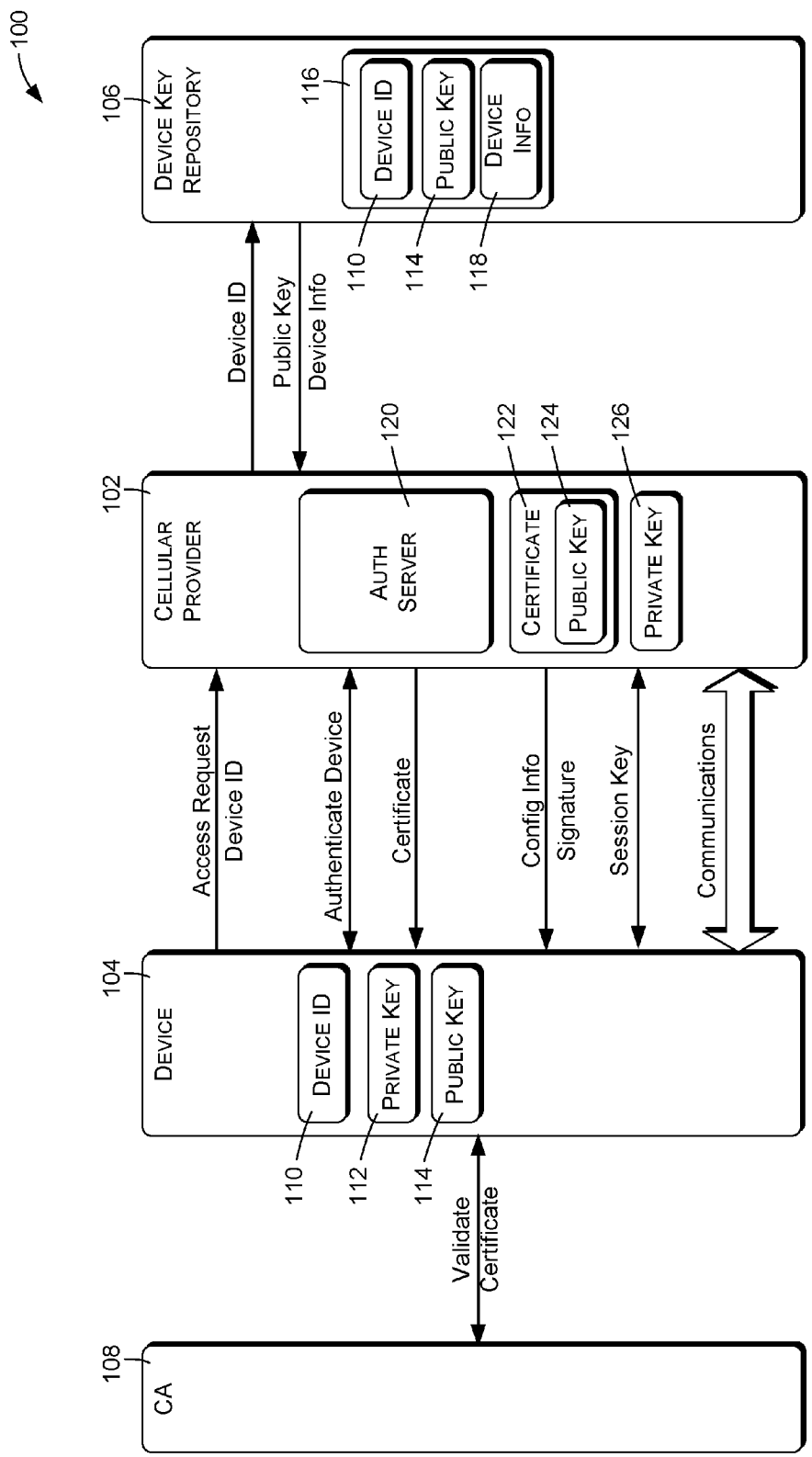
FIG. 1 is a block diagram of a system for performing mutual authentication between a cellular communication device and a cellular network provider.

The described implementations provide devices, systems, and methods that allow a cellular communication device to authenticate with a cellular network provider without using a physical token such as a subscriber identification module (SIM). An asymmetric cryptographic key pair is associated with and stored in non-volatile secure memory of each manufactured cellular communication device. The asymmetric key pair comprises a public key and a private key. A unique code such as an international mobile subscriber identity (IMSI) number is also stored on each device. The manufacturer of the device or another trusted entity maintains a public key repository that cross-references IMSIs of devices to the public keys of the devices. For each IMSI corresponding to a particular device, the repository can be referenced to find the public key of the device. The repository is public and trusted so that it can be accessed by multiple cellular network providers.

In order to gain access to a cellular network, a device sends a message to the network provider indicating the IMSI of the device. The network provider accesses the public key repository to determine the public key of the device. The provider then authenticates the device using a digital signature scheme as follows: the provider generates a random value message (RAND); the device receives and encrypts the RAND using the private key stored on the device and sends the encrypted RAND back to the provider; the provider decrypts the RAND with the public key of the device and compares the returned RAND with the RAND that was originally sent. If the two values match, the device is considered to be authenticated and is given access to the cellular network.

The cellular communication device may also authenticate the cellular network provider using public key infrastructure (PKI) techniques. For example, the cellular provider may send a digital identity certificate to the device. The device validates the certificate by using the services of a certification authority (CA) of a public key infrastructure (PKI). The certificate specifies a public key of an asymmetric cryptographic key pair corresponding to a private key held by the network provider.

Communications between the device and the provider may be digitally signed to allow each entity to verify the identity of the other. For example, messages from the device may be signed with the device private key and the provider may verify the signatures using the device public key, obtained from the repository based on the IMSI provided by the device. Similarly, messages from the provider may be signed using the private key of the provider, and the device may verify the signatures using the provider public key, specified by the certificate of the provider.

After authentication, further communications between the device and the cellular network are encrypted using unique session keys that are generated by either the device or the network provider using PKI.

When activating a device, the cellular network provider may also send configuration information to the device. The configuration information may be signed using the private key of the cellular provider, so that the device can verify the authenticity of the configuration information using the public key of the cellular provider. The configuration information may include things such as a service provider name, service dialing numbers, the telephone number of the device, roaming preferences, network connection parameters, etc.

FIG. 1 illustrates an example system 100 in which authentication of cellular telecommunication devices may be performed using asymmetric cryptographic techniques and a public key infrastructure (PKI). The system 100 comprises a cellular network provider 102, which provides wireless, cellular telecommunication services for multiple cellular communication devices 104. For purposes of discussion, only a single cellular communication device 104, referred to simply as the "device" 104 in the following, is shown in FIG. 1. The system also includes a key repository 106 and certification authority (CA) 108 of a public key infrastructure (PKI).

The device 104 may comprise any type of cellular communication device, such as a smartphone, a tablet computer, a personal computer, a laptop computer, a wearable device, a home automation device, a security device, a tracking device, etc. The device 104 is configured upon manufacture, distribution, or sale with a device ID 110. The device ID of a device is globally unique across all existing cellular devices. The device ID may comprise an international mobile station equipment identity (IMEI) number, as an example.

The device 104 is further configured upon manufacture, distribution, or sale to be associated with an asymmetric cryptographic key pair, comprising a private key 112 and a public key 114. The private key 112 is stored securely on the device 104, and the public key 114 may in some cases also be stored on the device 104. In addition, the public key 114 is stored in the key repository 106, indexed by the device ID 110.

The cryptographic key pair may be created in accordance with RSA cryptographic techniques. When using RSA asymmetric encryption/decryption techniques, a first entity may distribute its public key freely. That is, public keys do not need to be secret. When a second entity wishes to send an encrypted communication to the first entity, an algorithm is used to encrypt the communication using the public key of the first entity. Upon receiving the encrypted communication, the first entity uses its private key to decrypt the communication.

In addition to embedding the device ID 110, the private key 112, and the public key 114 on the device 104, the manufacturer, distributor, or seller of the device 104 adds the public key 114 to the key repository 106 so that the network provider 102 can access and use the public key 114 corresponding to any device ID 110. The key repository 106 may be maintained by the seller of the device 104, or may be maintained by a third party as a central repository that is accessible by many different device manufacturers or other device sellers.

The key repository cross-references device IDs and corresponding public keys. The key repository 106 comprises multiple entries 116, each indexed by a device ID 110, and each containing the public key 114 of the device 104 corresponding to the device ID 110. In addition, the entry 116 for a particular device ID 110 and corresponding device 104 may contain device information 118 regarding the device 104. For example, the device information 118 may indicate the manufacturer of the device 104, the model or type of the device 104, capacities, capabilities, or other specifications of the device 104, and so forth. The device information 118 is provided by the manufacturer or other seller or provider of the device 104.

The network provider 102 may comprise one or more servers or other functional components that perform device authorization. For purposes of discussion, the network provider 102 is shown as having an authorization server 120 that performs the actions described herein relating to authentication, although the functionality attributed herein to the authorization server 120 may be performed by more than one server or computational entity. The term "server," as used herein, refers to any computational entity or combination of computational entities that provides services for one or more other entities.

The network provider 102 may have a digital identity certificate 122 that has been provided by the CA 108. The network provider 102 may also have its own asymmetric cryptographic key pair comprising a public key 124 and a corresponding private key 126. The certificate 122 indicates or specifies the provider public key 124. The network provider 102 maintains the private key 126 in secret. The certificate 122 is signed by the CA 108, and the signature can be verified using the public key of the CA.

FIG. 1 shows example communications between the elements of the system 100, in a temporal order from top to bottom. However, the described communications may take place in different orders in various embodiments.

In order to gain access to a cellular network provided or supported by the network provider 102, the device 104 initially sends an access request to the cellular provider along with the device ID 110. This request may be signed using the private key of the device 104. In response to receiving the access request and device ID 110 from the device 104, the network provider 102 accesses the key repository 106 with the device ID 110 to determine and/or obtain the device public key 114. The network provider 102 then verifies the request signature using the device public key 114. In addition, the cellular network provider 102 may in some situations obtain the device information 118 associated with the device 104.

The network provider 102 and the device 104 then exchange information to authenticate the device 104 based on the device private key 112 and the device public key 114. This authentication may comprise, as an example; generating a random value message (RAND); sending the RAND to the device 104; encrypting the RAND at the device 104 using the device private key 112; sending the encrypted RAND back to the provider; decrypting the RAND with the device public key 114; and comparing the returned RAND with the originally generated RAND. If the comparison indicates that the two values are equal to each other, the device 104 is authorized for further access to the cellular network. These communications between the device 104 and the network provider 102, as well as subsequent communications, may be digitally signed using the device private key 112 and the provider private key 126.

In certain embodiments, the device 104 may also authenticate the network provider 102 and/or the authorization server 120 of the cellular provider. Provider authentication may comprise sending the digital identity certificate 122 to the device 104. The device 104 then validates the certificate using the public key of the CA that issued the certificate. If the certificate is validated, the network provider 102 is considered to be authenticated. As described above, the certificate 122 indicates the public key 124 of the network provider 102 so that the device 104 may send encrypted communications to the cellular provider using the public key 124. Further communications between the provider 102 and the device 104 may be encrypted using the public/private keys of the entities or using dynamically generated session keys as described below.

After the mutual authentication described above, the network provider 102 may provide configuration information to the device 104. In particular, the configuration information may be provided during an initial activation of the device 104. The configuration information may include a service provider name, service dialing numbers, network connection parameters, the telephone number to be assigned to the device, etc. The configuration information may be signed using the private key of the network provider 102, so that the device 104 can verify the authenticity of the configuration information using the public key of the network provider 102.

One or more unique session keys, each of which may comprise a symmetric cryptographic key, may also be exchanged between the network provider 102 and the device 104. The session keys may be generated by the cellular provider, encrypted using the public key of the device 104, sent to the device 104, and decrypted by the device 104 using the private key 112 of the device 104. Alternatively, the session keys may be generated by the device 104, encrypted using the public key of the network provider 102, sent to the network provider 102, and decrypted by the cellular provider using the private key 126 of the network provider 102.

Further communications between the network provider 102 and the device 104 are encrypted and decrypted using symmetric session keys.

Figure 2:
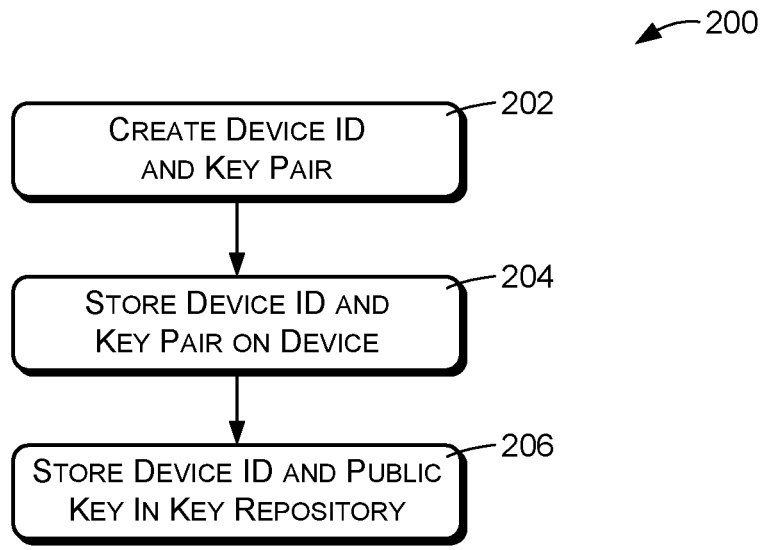
FIG. 2 is a flow diagram illustrating an example method of associating an asymmetric cryptographic key pair with a cellular communication device.

FIG. 2 shows an example method 200 that may be performed upon manufacture, distribution, sale, and/or initial configuration of a cellular telecommunication device. The method 200 may be performed by a seller of the device 104, such as a manufacturer, distributor, reseller, or other entity, prior to or in conjunction with the selling the device 104 to a consumer.

The example method 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other methods described throughout this disclosure, in addition to the example method 200, shall be interpreted accordingly.

An action 202 comprises creating a device ID and asymmetric cryptographic key pair for the device 104, wherein the key pair comprises the private key 112 and the public key 114. The key pair may be generated using RSA techniques.

An action 204 comprises storing the device ID and the corresponding key pair on the device. An action 206 comprises storing the device ID and the corresponding public key 114 in the key repository, in a manner such that a cellular network provider may determine the public key 114 of any device 104 by supplying the device ID 110. The key repository may expose a network-accessible interface so that various cellular providers may query the key repository to obtain public keys corresponding to individual devices.

Figure 3:
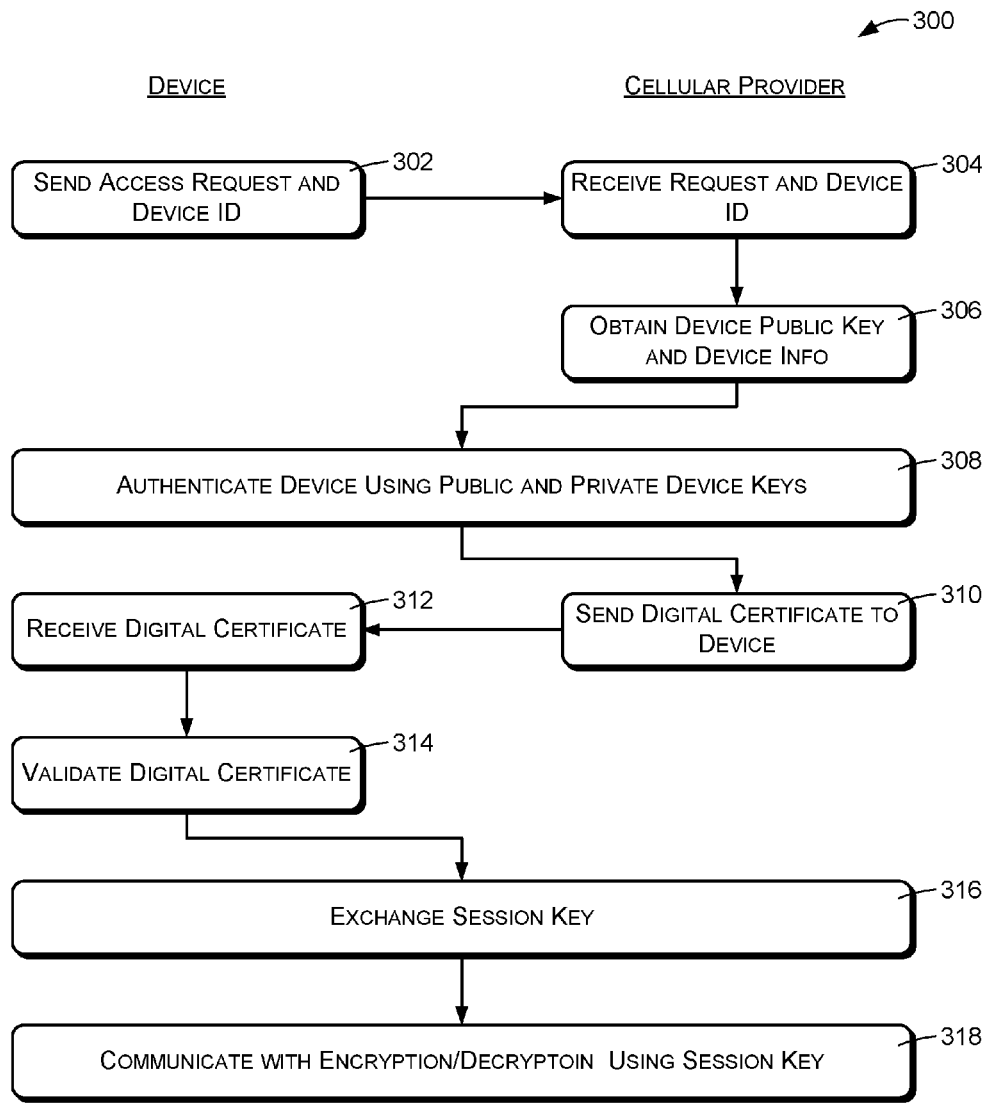
FIG. 3 is a flow diagram illustrating an example method of authenticating and communicating between a cellular communication device and a cellular network provider.

FIG. 3 shows an example method 300 that may be used in an environment such as shown in FIG. 1 for authentication between a cellular telecommunications device and a cellular network provider. Actions on the left side of FIG. 3 are performed by the cellular telecommunications device. Actions on the right side of FIG. 3 are performed by the cellular network provider. Actions that span both the right and left sides of FIG. 3 are performed by both the device and the provider in cooperation with each other.

An action 302, performed by the device, comprises sending an access request and a device ID to the provider. The access request may be transmitted using the cellular network of the provider, or may in some cases be transmitted using another network such as the Internet. In particular, during initial activation of the device, the device may communicate with the cellular network provider through a Wi-Fi access point and through the Internet, rather than through the cellular network of the provider. In some embodiments, the access request may be signed using the private key of the device.

An action 304, performed by the cellular network provider, comprises receiving the request and the device ID. An action 306, also performed by the cellular network provider, comprises obtaining the public key of the device. The action 306 may be performed by querying a public key repository. The public key repository may have a network accessible interface that provides a public key in response to a query that specifies a device ID. The public key of the device may be used to verify the digital signature of the access request.

The action 306 may also comprise obtaining device information from the key repository.

An action 308, performed by the device and the provider, comprises authenticating the device using the public and private keys of the device. As an example, the action 308 may comprise generating a RAND and sending the RAND to the device. The device encrypts the RAND using the private key of the device and returns the encrypted RAND to the provider. The provider then decrypts the RAND using the device public key and verifies that the decrypted RAND is the same as the RAND that was originally generated by the provider. Any or all of these communications between the provider and the device may be digitally signed using the private keys of the provider and the device, respectively.

An action 310, performed by the provider, comprises sending the digital identity certificate of the provider to the device. The digital identity certificate is signed by a certification authority (CA) and indicates the public key of the provider.

An action 312, performed by the device, comprises receiving the digital identity certificate. An action 314, also performed by the device, comprises validating the digital certificate using the CA of a public key infrastructure (PKI).

An action 316, performed by the device and the provider, comprises exchanging one or more session keys. The session keys may be randomly generated symmetric keys, which are used for subsequent communications between the device and the provider. The session keys may be generated and provided by either the device or the provider. If the device generates the session keys, the device encrypts the session keys using the public key of the provider and transmits the encrypted session keys to the provider. The provider decrypts the session keys using the private key of the provider. If the provider generates the session keys, the provider encrypts the session keys using the public key of the device and transmits the encrypted session keys to the device. The device decrypts the session keys using the private key of the device.

An action 318, also performed by both the device and the provider, comprises communicating with each other using the session keys. That is, outgoing communications are encrypted using the session keys and incoming communications are decrypted using the session keys. The communications of FIG. 3 may include setup and normal operations, and may include voice data and other data.

Figure 4:
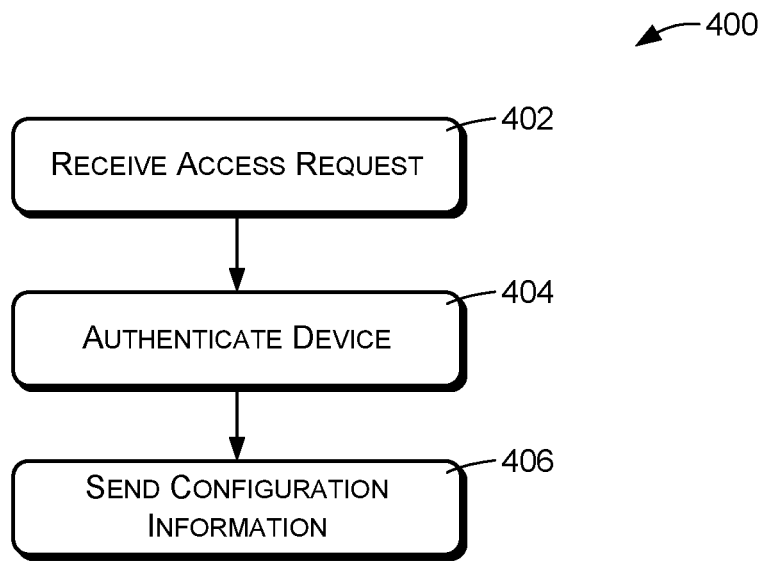
FIG. 4 is a flow diagram illustrating an example method of activating and configuration a cellular communication device.

FIG. 4 shows an example method 400 of initially activating and configuring a cellular telecommunication device, which may be performed by a cellular network provider.

An action 402 comprises receiving an access request and/or activation request from the device. The access request may be received over a non-cellular network, such as over an Internet-based communication channel, wherein the device uses its Wi-Fi capabilities to communicate through the Internet. As described above, the access request specifies the device ID of the requesting device. The access request may be digitally signed using the private key of the requesting device.

An action 404 comprises authenticating the device. The device may be authenticated as described above with reference to the action 308 of FIG. 3.

An action 406 comprises sending configuration information to the device. The configuration information may be sent through the non-cellular network, such as the described internet-based communication channel. The configuration information may include cellular parameters, access numbers and/or addresses, and so forth, and more generally may include any information that the device may need for establishing cellular communications with a cellular communication network. In response to receiving the configuration information and being authenticated by the cellular network provider, the device may begin communicating with the provider over the wireless cellular network of the provider.

The action 406 may include generating a digital signature of the configuration information using the private key of the cellular network provider and sending the digital signature to the cellular communication device. The cellular communication device can verify the digital signature using the public key of the cellular network provider.

Figure 5:
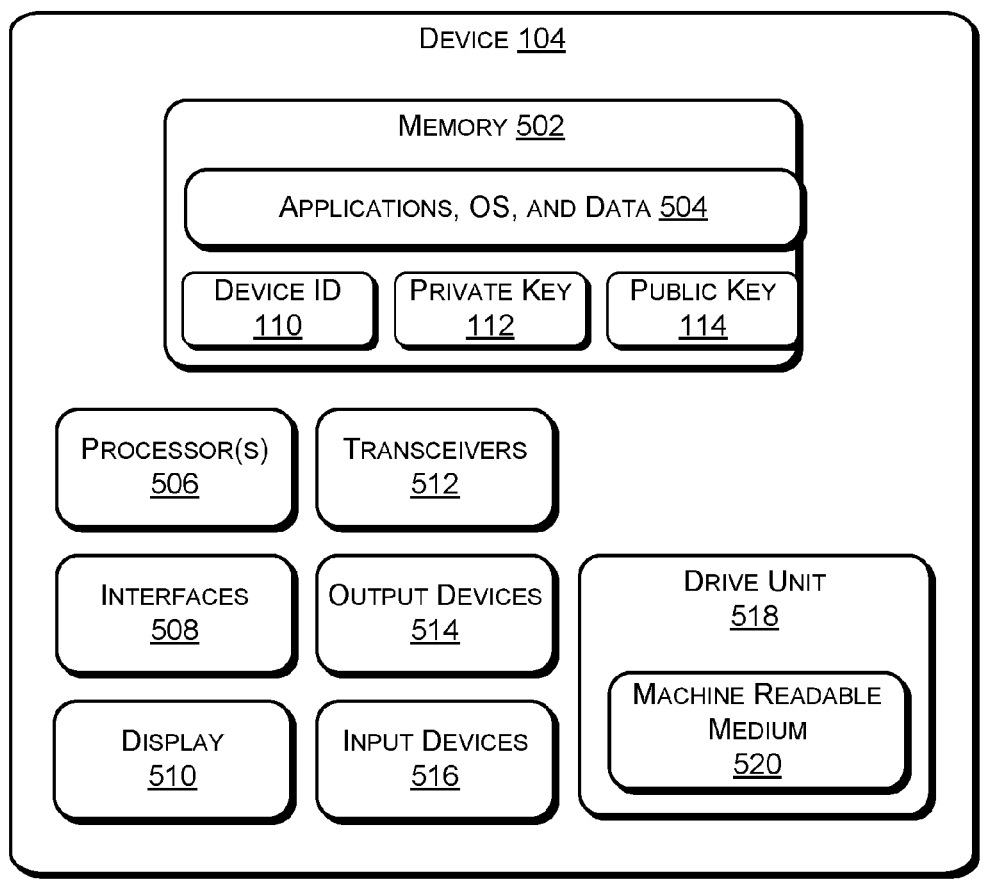
FIG. 5 is a block diagram of an example cellular communication device.

FIG. 5 is a block diagram of an illustrative device 104 in accordance with various embodiments. As shown, the device 104 may include a memory 502, which may store applications, an operating system (OS), and data 504. The device 104 further includes processor(s) 506, interfaces 508, a display 510, transceivers 512, output devices 514, input devices 516, and drive unit 518 including a machine readable medium 520.

In various embodiments, the memory 502 includes both volatile memory and non-volatile memory. The memory 502 can also be described as non-transitory computer storage media and may include removable and non-removable media implemented in any method or technology for storage of information, such as computer readable instructions, data structures, program modules, or other data. The applications, OS, and data 504 are stored in the memory 502. The device ID 110, the private key 112, and the public key 114 may also be stored in the memory 502.

Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 104. Any such non-transitory computer-readable media may be part of the device 104.

In some embodiments, the processor(s) 506 is a central processing unit (CPU), a graphics processing unit (GPU), or both CPU and GPU, or other processing unit or component known in the art.

In various embodiments, the interfaces 508 are any sort of interfaces known in the art. The interfaces 508 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 510 may comprise a liquid crystal display or any other type of display commonly used in telecommunication devices or other portable devices. For example, display 510 may be a touch-sensitive display screen, which may also act as an input device or keypad, such as for providing a soft-key keyboard, navigation buttons, or the like.

In some embodiments, the transceivers 512 include any sort of transceivers known in the art. For example, transceivers 512 may include radio transceivers and interfaces that performs the function of transmitting and receiving radio frequency communications via an antenna. The radio interfaces facilitate wireless connectivity between the device 104 and various cell towers, base stations and/or access points of a cellular network and other networks. In some embodiments, the transceivers 512 may include a Wi-Fi transceiver for communications using one or more variants of the IEEE 802.11 standard.

In some embodiments, the output devices 514 include any sort of output devices known in the art, such as a display (already described as display 510), speakers, a vibrating mechanism, or a tactile feedback mechanism. The output devices 514 also include ports for one or more peripheral devices, such as headphones, peripheral speakers, or a peripheral display.

In various embodiments, the input devices 516 include any sort of input devices known in the art. For example, the input devices 516 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 520 stores one or more sets of instructions (e.g., software) that embodying operating logic for implementing and/or performing any one or more of the methodologies or functions described herein. The instructions may also reside, completely or at least partially, within the memory 502 and within the processor 506 during execution thereof by the device 104. The memory 502 and the processor 506 also may constitute machine readable media 520.

Figure 6:
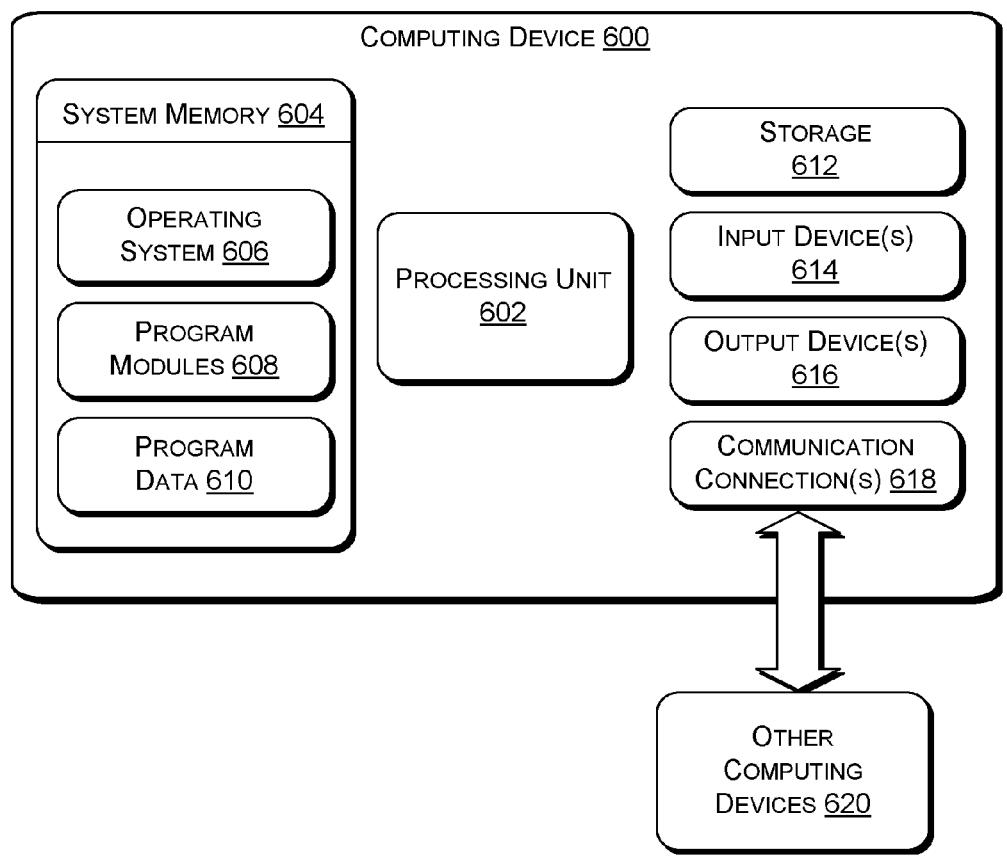
FIG. 6 is a block diagram of an example computing device that may be used to implement various components of a cellular network, including servers of the cellular network.

FIG. 6 is a block diagram of an illustrative computing device 600 such as may be used to implement the authorization server 120 and/or other servers and components of the network provider 102 and the cellular network of the provider 102. In various embodiments, the computing device 600 may comprise a network server and may include at least one processing unit 602 and system memory 604. Depending on the exact configuration and type of the computing device 600, the system memory 604 may be volatile (such as RAM), non-volatile (such as ROM, flash memory, etc.) or some combination of the two. The system memory 604 may include an operating system 606, one or more program modules 608, and may include program data 610.

The computing device 600 may also include additional data storage devices (removable and/or non-removable) such as, for example, magnetic disks, optical disks, or tape. Such additional storage is illustrated in FIG. 6 by storage 612.

Non-transitory computer storage media of the computing device 600 may include volatile and nonvolatile, removable and non-removable media implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such non-transitory computer-readable storage media may be part of the computing device 600.

In various embodiment, any or all of the system memory 604 and storage 612 may store programming instructions which, when executed, implement some or all of the function functionality described above as being implemented by a cellular services provider and/or components provided by a cellular services provider.

The computing device 600 may also have input device(s) 614 such as a keyboard, a mouse, a touch-sensitive display, voice input device, etc. Output device(s) 616 such as a display, speakers, a printer, etc. may also be included. The computing device 600 may also contain communication connections 618 that allow the computing device to communicate with other computing devices 620.

Although features and/or methodological acts are described above, it is to be understood that the appended claims are not necessarily limited to those features or acts. Rather, the features and acts described above are disclosed as example forms of implementing the claims.

What is claimed is:

1. A cellular communication device, comprising:
one or more processors;
one or more non-transitory computer-readable media storing a device ID and a private key of an asymmetric cryptographic key pair,
the one or more non-transitory computer-readable media storing computer-executable instructions that, when executed on the one or more processors, cause the one or more processors to perform actions comprising:
    sending an access request including the device ID to a cellular communications provider;
    receiving a random value from the cellular communications provider;
    generating an encrypted value by encrypting the random value using the private key;
    sending the encrypted value to the cellular communications provider;
    receiving a digital identity certificate from the cellular communications provider in response to a determination by the cellular communications provider that the encrypted value, after being decrypted using a public key of the asymmetric cryptographic key pair, matches the random value; and
    verifying the digital identity certificate using a public key infrastructure.

2. The cellular communication device of claim 1, the actions further comprising:
exchanging one or more session keys with the cellular communications provider; and
encrypting communications with cellular communications provider using the one or more session keys.

3. The cellular communication device of claim 2, wherein exchanging one or more session keys with the cellular communications provider comprises:
randomly generating symmetric keys;
encrypting the symmetric keys using a public key of the cellular communications provider;
transmitting the encrypted symmetric keys to the cellular communications provider, the encrypted symmetric keys being decryptable by the cellular communications provider with a private key of the cellular communications provider.

4. The cellular communication device of claim 2, wherein exchanging one or more session keys with the cellular communications provider comprises:
receiving encrypted symmetric keys from the cellular communications provider, the encrypted symmetric keys being encrypted with the public key;
decrypting the encrypted session keys using the private key.

5. The cellular communication device of claim 1, wherein the private key is stored on the cellular communication device by a seller of the cellular communication device.

6. The cellular communication device of claim 1, the actions further comprising:
generating one or more session keys;
encrypting the one or more session keys using a public key of the cellular communications provider;
sending the encrypted one or more session keys to the cellular communications device;
encrypting communications with the cellular communications provider using the one or more session keys.

7. The cellular communication device of claim 1, the actions further comprising:
receiving one or more encrypted session keys from the cellular communications provider;
decrypting the one or more session keys using the private key; and
encrypting communications with the cellular communications provider using the one or more session keys.

8. A method comprising:
receiving a device identifier from a cellular communication device, the cellular communication device being associated with an asymmetric cryptographic key pair comprising a private key and a public key;
accessing a key repository using the device identifier to determine the public key of the cellular communication device, the key repository cross-referencing device identifiers to respectively corresponding public keys;

sending a random value to the cellular communication device;

receiving an encrypted value from the cellular communication device, the encrypted value being an encrypted version of the random value generated by the cellular communication device using the private key;

generating a decrypted value from the encrypted value using the public key of the cellular communication device; and authenticating the cellular communication device based on a determination that the decrypted value is the same as the random value.

9. The method of claim 8, further comprising:

sending a digital identity certificate to the cellular communication device.

10. The method of claim 8, further comprising:

exchanging one or more session keys with the cellular communication device; and encrypting communications with the cellular communication device using the one or more session keys.

11. The method of claim 8, further comprising storing the private key on the cellular communication device prior to selling the cellular communication device to a consumer.

12. The method of claim 8, further comprising storing the public key in the key repository prior to selling the cellular communication device to a consumer.

13. The method of claim 8, further comprising:

sending configuration information to the cellular communication device;

generating a digital signature of the configuration information; and sending the digital signature to the cellular communication device.

14. A method, comprising:

storing, at a cellular communication device, a device ID and a private key of an asymmetric cryptographic key pair;

sending an access request and the device ID from the cellular communication device to a cellular communication provider;

receiving a random value message (RAND) at the cellular communication device from the cellular communication provider;

generating an encrypted RAND with the cellular communication device by encrypting the RAND with the private key;

sending the encrypted RAND from the cellular communication device to the cellular communication provider;

receiving a digital identity certificate at the cellular communication device from the cellular communications provider upon the cellular communications provider decrypting the encrypted RAND and verifying that it matches the RAND, the digital identity certificate being signed by a certification authority of a public key infrastructure; and verifying the digital identity certificate with the cellular communication device using the certification authority.

15. The method of claim 14, further comprising:

exchanging one or more session keys between the cellular communication device and the cellular communications provider; and encrypting communications with the cellular communications provider using the one or more session keys.

16. The method of claim 15, wherein exchanging one or more session keys comprises:

randomly generating symmetric keys generated with the cellular communication device;

encrypting the symmetric keys at the cellular communication device using a public key of the cellular communications provider;

transmitting the encrypted symmetric keys from the cellular communication device to the cellular communications provider.

17. The method of claim 15, wherein exchanging one or more session keys comprises:

receiving symmetric keys at the cellular communication device from the cellular communications provider, the symmetric keys being encrypted with a public key of the cellular communication device;

decrypting the session keys at the cellular communication device using the private key.

18. The method of claim 14, wherein the private key is stored on the cellular communication device by a seller of the cellular communication device.

19. The method of claim 14, further comprising digitally signing the transmission of the access request and the device ID at the cellular communication device using the private key.

20. The method of claim 14, further comprising digitally signing the transmission of the encrypted RAND at the cellular communication device using the private key.

* * * * *